Dec. 6, 1960   J. C. BOESCH, JR., ET AL   2,963,153
PNEUMATIC ELEVATOR AND RECLEANER
Filed Aug. 29, 1957   2 Sheets-Sheet 1

INVENTORS:
JOHN C. BOESCH, JR.
WILLIAM G. MOORE
BY

ATTORNEY.

Dec. 6, 1960  J. C. BOESCH, JR., ET AL  2,963,153
PNEUMATIC ELEVATOR AND RECLEANER
Filed Aug. 29, 1957  2 Sheets-Sheet 2
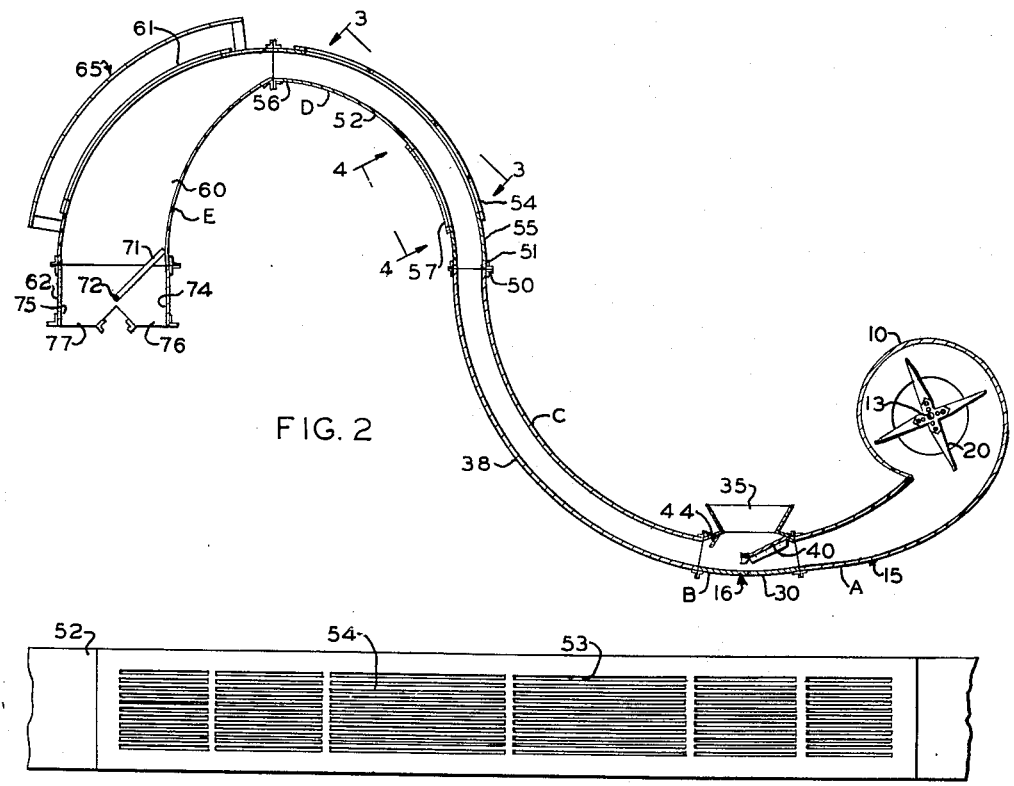
FIG. 2
FIG. 3
FIG. 4
FIG. 5
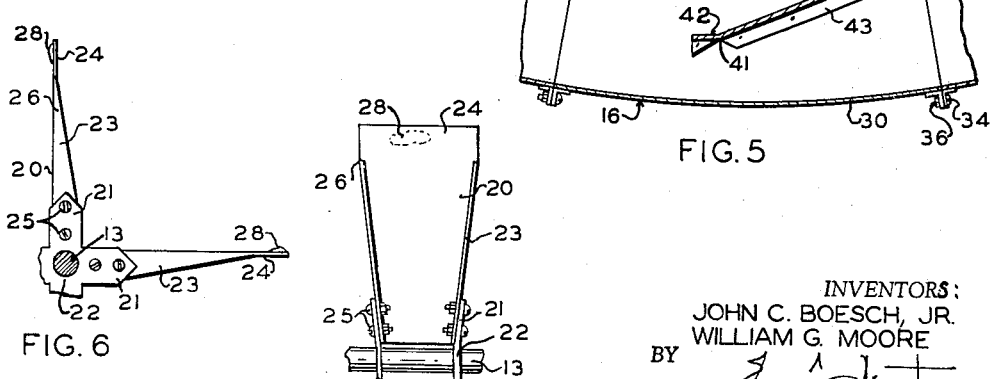
FIG. 6
FIG. 7
INVENTORS:
JOHN C. BOESCH, JR.
WILLIAM G. MOORE
BY
ATTORNEY.

United States Patent Office 2,963,153
Patented Dec. 6, 1960

2,963,153

PNEUMATIC ELEVATOR AND RECLEANER

John C. Boesch, Jr., South Charleston, W. Va., and William G. Moore, Albany, Ga., assignors to Lilliston Implement Company, Albany, Ga., a corporation of Georgia Filed Aug. 29, 1957, Ser. No. 681,116

4 Claims. (Cl. 209—143)

This invention relates to a pneumatic elevator and recleaner, and is particularly concerned with apparatus for elevating and recleaning harvested and separated seed crops, such as peanuts or the like, after processing thereof through a conventional combine.

Agricultural equipment of the harvesting type, such as combines and like mobile units designed to sever, thrash, winnow or otherwise separate seed crops from their vines, roots, or plant structures, commonly employ some type of conveyor or elevating means for lifting the separated seed upwardly from the discharge chute of the combine to a position for downward gravity feed to a receiving means or bagging station. For the most part, such elevators are simple mechanical flight conveyors of the continuously moving, endless belt or chain type. While such mechanical elevators or lifts have been effective and efficient, certain limitations appear to be inherent in their construction and operation. One such limitation is with respect to the power consumption, noise, vibration and wear of the continuously moving mechanical elements involved, not to mention the initial cost as well as the upkeep of such structures including their belts, chains, conveyor bars or buckets and the mechanical drives therefor. Another difficulty which is inherent in the use of mechanical conveyors or elevators is the damage to the seed resulting from the contact and manipulation of relatively fragile and easily bruised crops, such as peanuts, beans, and the like, by contact with the hard, unyielding and frequently sharp edges of the conveyor. A further and more important problem in the use of such mechanical elevators is the fact that, as a rule, such elevators will carry with them such debris, foreign matter and dirt as may be discharged with the seed from the combine. This difficulty is particularly objectionable in the handling of crops such as peanuts where the adherence of soil of a tenacious nature frequently persists after the cleaning operation of the combine. A recleaning of such crops as they are elevated and discharged will materially improve the delivered crop in an expeditious and economical manner.

The present invention seeks to overcome the above and like problems with respect to the use of mechanically driven elevators in association with harvesting combines, and to provide for a recleaning of the crop by the use of a pneumatic lift or elevator. By such apparatus the mechanical moving parts are reduced to the simple blower which may be directly driven from the power source of the combine with a minimum of pulleys, belts and intermediary driving mechanism, and which may be operated at high efficient speed with a minimum of noise, vibration and wear. A further and important advantage of the present pneumatic means as the lift or conveyor for separated seeds, such as peanuts, is the recleaning here provided as an incident to the conveyance in an air stream which not only effectively separates chaff and light debris from the relatively heavy and consolidated weight of the peanuts, but through friction and vibration tends to dislodge otherwise adherent dirt and soil to dispose of the same by air conduction prior to the gravity discharge of the recleaned crop.

It will thus be seen that it is among the objects of the present invention to provide a novel, simple and improved elevator for combines which will be effective and efficient in operation, minimize the danger of damage to the harvested crop, and provide a structure relatively quiet in operation and free from excessive deterioration due to wear and vibration, as well as one admirably adapted to meet the demands of economic manufacture.

More specifically, it is an object of the present invention to provide pneumatic means for lifting or elevating separated seed crops from the discharge chute of a combine and to deliver the same for gravity discharge to receiving means or a bagging station.

Another important object of the present invention is to provide a combined elevator and recleaner for the separated crop discharged by a mobile combine by which a recleaning is effected as an incident to the elevation of seed to a point of gravity discharge.

Other objects of the present invention are to provide in a pneumatic elevator improved means for controlling penumatic flow to effectively and efficiently engage and convey rleatively light seed crops, together with means for the discharge of separated dirt, debris and foreign matter without interference with the conveyance of the crop to its point of discharge. The construction further provides for the directional discharge of such dirt, debris and foreign matter so as to protect operators in the reception and handling of the conveyed and recleaned product.

Numerous other objects, features and advantages of the present invention will be apparent from consideration of the following specification, taken in conjunction with the accompanying drawings, in which:

Fig. 2 is a detail vertical cross section through the pneumatic elevator and recleaner of the present invention as it would appear with the side removed.

Fig. 3 is an enlarged plan view of a top portion of the delivery tube of the invention taken on line 3-3 of Fig. 2.

Fig. 4 is a view similar to Fig. 3 of a bottom portion of a delivery tube taken on line 4—4 of Fig. 3.

Fig. 5 is an enlarged longitudinal cross section of the receiving hopper of the conveyor.

Fig. 6 is a detail fragmentary side elevation of the impeller blade assembly of the blower of the present conveyor, and Fig. 7 is a detail plan view of one of the impeller blades.

Figure 1:
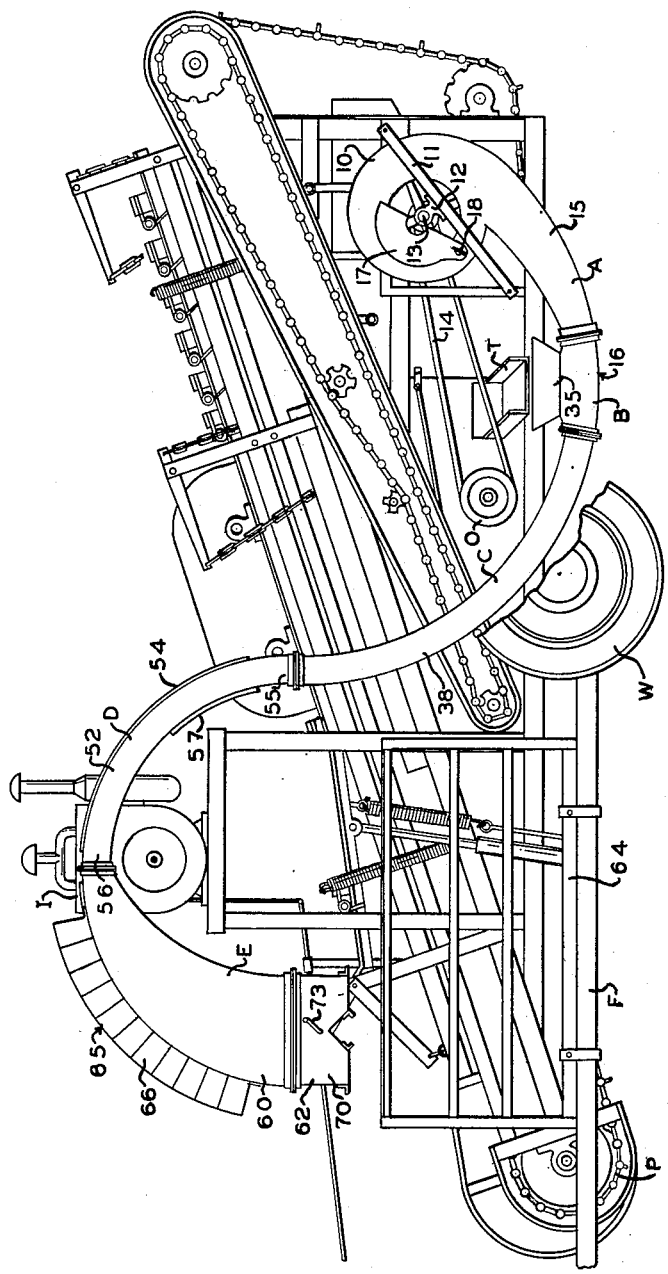
Fig. 1 is a side elevation of the pneumatic elevator and recleaner of the present invention as applied to one conventional type of harvesting combine.

As illustrated in Fig. 1, the pneumatic elevator and recleaner of the present invention is adapted to be mounted on a conventional combine in lieu of the more general mechanical flight conveyor types of elevators. Since the present invention is not limited or confined to combination with any specific type of combine, it is deemed adequate to recite that the present structure provides a hopper or like receiving means adapted to be disposed adjacent and in communication with the usual discharge chute of a combine, together with a pneumatic blower which may be operated from the power source of such conventional combine and a discharge tube in which air propelled by the blower and having entrained seed or like crop at the hopper, will elevate and convey the same to a point for gravity discharge above a station at which such crops may be sacked or bagged in a conventional fashion. An important feature of the device is the recleaning of the seed as an incident to the travel through the conveyor tube. For purpose of illustrating the application of the invention to one particular type of combine, Fig. 1 has represented a combine of the form shown in the patent to John T. Phillips, Jr., No. 2,788,628, dated April 16, 1957, which is hereby included by reference and to which attention is directed for an understanding of a combine construction and operation for separating peanuts from the vines, this invention being particularly adapted for use with implements of this general nature, as well as with peanut pickers or any other place where elevation and/or cleaning of light particulate material is desired.

Suffice it, therefore, for present consideration to refer to the combine as being mounted upon a generally horizontal frame F, rearwardly supported upon wheels W for conveyance over a field by a tractor or the like. A picker chain P elevates the crop to the internal means for separating the peanuts from the vines, or such other thrashing, winnowing or treating operation of the combine. The separated seeds are discharged through the trough T, and internal combustion engine I is provided for motivation of the chain P, the separating mechanisms and such other instrumentalities as constitute the combine mechanism. A power takeoff O is included from which a drive is provided for the blower of the present pneumatic elevator and recleaner.

The structure here presented is specifically designed and arranged for application to a combine of the type here schematically presented and fully disclosed and described in the aforementioned patent. It will be understood that variations in design and structural features may be resorted to for the appropriate application of pneumatic elevators and recleaners embodying the present inventive concept for application to other types of combines of varying designs and modes of operation.

Referring more particularly to the specific structures of that form of the invention shown by way of illustration, it will be seen that the pneumatic elevator and recleaner includes a rotary blower 10 suitably mounted in any desired manner on the framework of the combine, as by means of inclined bearing bars 11 and bearing boxes 12 mounted to support the axle shaft 13 of the impeller of the blower. A belt 14 is driven from the power takeoff to provide for the rotation of the fan of the blower at the desired speed to provide a requisite air blast to be directed from the extension 15 of the fan housing to the hopper 16. It will be noted that in the usual construction the centers of the sides of the fan housing are open to provide for the intake of air which is propelled centrifugally from the housing by rotation of the fan blades. A feature of the present construction is the provision of generally arcuate inflow control panels 17 adjustably pivoted as at 18 to the fan housing to be moved to and from the opening by which the velocity and volume discharged from the fan may be conveniently varied during operation of the combine without alteration of the driving connection through the belt 14.

A further feature of the novel blower of the present invention by which it is particularly adapted to effectively and efficiently deliver the air blast through the extension 15 to the hopper 16 is the provision of outwardly flanged blades, illustrated in detail in Figs. 6 and 7. These blades 20 are shown as supported between opposed radially extending mounting extensions 21 of opposed hubs 22 secured to a shaft 13. Each blade includes a central body of generally frusto-triangular form, the side edges of which are provided with outwardly diminishing tapered side flanges 23. The inner broad ends of flanges 23 at the narrow inner ends of the blades 20 are secured to the extensions 21 by pairs of radially arranged bolt assemblies 25. As indicated at 26, the side flanges 23 terminate short of the outer terminal broad blade ends 24. At the ends there may be secured, as by welding, suitable balance weights 28 by which supplemental centrifugal force is applied to the end of the blade, not only to balance the same, but to provide for resistance to deflection of the blade, in motion, by virtue of the centrifugal force resulting from the weight. By the provision of such weights 28 in combination with the right angularly directed tapered side flanges 23, substantial rigidity is provided for the blade and the material thereof may hence be of lighter material than otherwise required.

Another feature of the rotor of the present blower is the location of the flat outwardly extending body of the blades 20 parallel with the trailing straight side of the radial extension 21. In this manner the blades extend in parallel spacing from the radial line of the center of extension 21 as defined by the bolt assemblies 25. The blades thus while extending generally outwardly from the shaft 13 are not radial, but are spaced from a radial line from the axis of the shaft.

An important feature of the invention is the design, arrangement and configuration of the total elevator structure which may be generally defined as sinusoidal or S-shaped, proving an undulating passage free from sharp turns or angles and characterized by smoothly curving sweeps. Such arrangement insures effective entrainment and elevation of seed with minimum air pressure or velocity. Thus, as here shown, the blower casing sweeps downwardly in a gentle curve A to meet the hopper, hereinafter described in detail, the convex bottom of the hopper conforms with and continues the curvature of the blower casing forming the lowest point B in the S-shaped path of the conveyor. From the hopper, an intermediate imperforate conveyor tube curves upwardly to define the generally horizontal to vertical curve C of the S-shaped path of travel. The outward reverse portion D of the curve, wherein the direction sweeps from vertical to horizontal, is defined by an upper tube section. As herein further discussed this upper tube section includes top outlet louvers for the discharge of dirt laden air from the outer peripheral strata of air sweeping upwardly and outwardly and thus urged with its burden of debris centrifugally from the restrained path of the top of the S. This section also includes a bottom wall air inlet screen by which clean air is admitted just prior to the horizontal turn of the upper sweep. Such admission, by the aspirating effect of the forced air moving thereover, precludes turbulence resulting from a curving reversal of air flow and insures continuance of conducting entrainment of peanuts over the top curve of the S for vertical downward discharge through the terminal curve E of the S-shaped path of travel.

Referring further to the structural features of the invention, the hopper 16 of the present invention is formed as a generally elongate transversely rectangular open ended body characterized by a sweeping convex bottom 30 joined by vertical side walls 31. The hopper ends are defined by upwardly sloping end flanges 32, inwardly of which sloping top edges 33 combine with the side walls 31 to define a generally rectangular opening fitted with an outwardly tapering guide funnel 35. The hopper funnel 35 is of course disposed in position to receive the separated peanuts, peas, beans, or like seed as they are delivered from trough T of the combine, or other source.

The hopper unit of the elevator is adapted to be secured by its end flange 32 to the companion flange 34 of discharge tube 15 of the blower by suitable connecting bolts 36 or other securing means. As noted, the combined configuration of the blower casing and hopper provides an S-shaped curved sweeping path of travel.

The hopper is constructed and arranged to provide a venturi action for the air admitted thereto from the blower and discharged therefrom to the upwardly directed intermediate elevating tube 38, forming the curve C of the conveyor. This venturi action is provided by an inwardly and downwardly inclined transverse venturi baffle 40 extending inwardly and downwardly from the receiving end of the hopper to a point approximately midway of the open top thereof. This approximate mid point is indicated by the terminus 41 of the inclination of the baffle 40 from which it extends further toward the outlet end of the hopper in a horizontal position by a continuation lip or flange 42. The baffle 40 and its flange 42 may be suitably secured in the location depicted by the provision of side flanges 43 which may be welded or otherwise suitably secured to the side walls 31 of the hopper. A cooperating inclined lip 44 extends inwardly from the open mouth of the hopper precluding upward and outward escape of air from the turbulence created by the venturi.

By this construction, it will be seen that the air supplied to the hopper by the blower produces a suction through the open top of the hopper and over the inclined plate 40 by venturi action, thus entraining the peanuts or products discharged to the hopper in the air delivered from the blower.

Such material is carried forwardly through the hopper to the associated elevator section 38. In operation, it will be understood that the peanuts, and therewith such dirt and debris as may be discharged from the trough T, will fall upon the inclined plate 40 and slide by gravity to the terminal horizontal portion 42 where they will be crowded forwardly to spill over into the high velocity air passing from under the baffle and extending beyond the venturi restriction formed thereby. It will also be understood that a typical turbulence at the edge of the extension 42 will assist in the entrainment of material entering the hopper, and air will be induced to flow inwardly through the open top of the hopper by the aspirating effect of the baffle, further assisting in drawing the peanuts inwardly to be entrained in the expanding air flow forwardly from the venturi.

From the hopper 16 the air passes with the peanuts, and such dirt, debris or foreign matter as may be delivered therewith, upwardly through the generally arcuate elevating section 38 which is secured to the outlet end of the hopper by the innerengagement of end terminal flanges 33 of the hopper with cooperating terminal flanges 45 of the lower end of the elevating section 38. Section 38 constitutes an approximately 45 degree bend, forming the first upward sweep section C of the total S-configuration of the elevator.

The upper end of the tubular elevating section 38 is secured by means of terminal flanges 50 with the corresponding terminal flanges 51 of an oppositely curved arcuate separation section 52, forming the section D of the S-curve, preferably section 52 is of the same generally uniform rectangular cross section as the elevating section 38. For the free discharge of dirt, debris and foreign matter from the conveying flow of air impelled by the blower 10 the outer convex top of section 52 is slotted as at 53 to provide successive sections of transverse dirt laden air discharge louvers 54 through which peripheral portions of the air bearing the dirt and foreign matter may be discharged from the air stream by centrifugal force without destroying the air borne condition of the peanuts carried upwardly from the section 38. The louvers are, of course, closely spaced to prevent the passage of the peanuts therefrom. As will be noted, the lower curving portion 55 of the section 52 is generally vertical where it engages the section 38, while its opposite terminal 56 is generally horizontal. As will be noted, the location of the louvers 54 is at the beginning of the outward curvature of section 52 where a direction change of air flow from vertical toward horizontal begins. At this point forces will become effective in this area to urge heavy dirt and debris outward to the periphery of the curving air flow. To preclude turbulence which may inhibit the conveyance of the peanuts as dirt laden air discharges from louvers 54, and to off set the volume of air escaping, as well as to supplying a clean conveying and entraining flow of air at the upper portions of the section 52 an air inlet screen 57 is provided on the under or convex bottom surface of the section 52 at an appropriate midsection opposite the beginning of the louvers 54. As indicated, this location is closer to the inlet end 55 than to the outlet end 56 and at a position in the concave curvature of the section 52 corresponding to the beginning of the horizontal component of motion of the peanuts as they are directed outwardly to horizontal flow. In the action of the air as it traverses the section 52, the outer marginal peripheral flow moving along the top convex wall of the section 52 will be emitted from the louvers 54 carrying therewith dirt and foreign matter separated from the peanuts in the recleaning thereof as they travel in the air stream. As the main body of the air directed from the blower 10 passes over the screen 57, fresh air is induced to flow inwardly by an aspirating action so as to avoid turbulence and to insure the continued entrainment of the peanuts as they are carried upwardly through the horizontal terminal portion 56.

The terminal discharge end of the conveyor is formed by a downwardly inclined arcuately expanding chamber 60 constituting the terminal downward curve E of the conveyor S from the section 52, peanuts carried by momentum float in the air gently curving into section 60 to continue in their arcuate path as the air force and velocity diminishes. The section 60 is provided on its upper outwardly convex surface with louvers 61 in the nature of the louvers 54. Through the louvers 61 the impelling air may be fully expelled, leaving the peanuts free to fall freely by gravity, thus avoiding a discharge of air under pressure at the open discharge end 62 of the section 60. As will be noted, the discharge end of the section 60 is directly over a receiving and bagging station 64 which is adapted to support operators who may apply bags to the discharge portion of the conveyor and sack the same as the combine is moved over the field. In order to preclude the forceful discharge of air in the direction of such operators, an arcuate deflector 65 is provided with its vertical inner edge 66 secured at the side edge of the louvers 61, the cross section of the deflectors being curved to an extent of approximately 90 degrees to provide a free open side for the unimpeded discharge of the air under pressure. As will be noted, the deflectors are formed by contiguous interjoined segments 66 which are of diminishing width as they approach the section 60, so as to form a continuous series of interrelated arcuate scales constituting a deflecting barrier throughout the length of the louvers of section 60.

The downwardly directed vertical terminal end 62 of the section 60 is preferably fitted with a dual discharge trough formed with a central deflecting plate 71 which may be pivotally mounted as at 72 and controlled by external manual handles 73. This arrangement is such that by appropriate inclination of the plate 71 the peanuts discharged from the section 60 may be induced to flow to either the right hand section 74 or the left hand section 75 of the discharge housing 70. Thus a selective discharge of the peanuts into suitable bags or receptacles as they are successively applied to the open ends 76 and 77 of the sections 74 and 75 is received.

In operation of the present pneumatic elevator and recleaner, as the separated seeds and such debris and foreign matter or adhering dirt are discharged from the trough T of the combine they are received and guided through the funnel 35 of the hopper 16 to either strike the baffle 40 and slide downwardly toward the lip 42 and thereover into the expanding air flow produced by the venturi action, or such seed as drop vertically in front of the lip 42 will be immediately engaged and entrained by the air flow. It will, of course, be understood that the blower operated with the combine produces the flow of air discharged in a downwardly curving sweeping motion through the section A, which curved portion is carried on through the convex bottom wall 30 of the hopper. This curved section B in the path of air flow constitutes the lowest substantially horizontal path in the S-shaped line of motion of the air. The entrained, entrapped and blown seed and discharged debris are swept upwardly through the section C in the lower convolution of the total S path of travel to be delivered by the intermediate section 38 to the upper section 52. It will be understood that in the travel of the entrained seed, jostling contact and impingement of such seed against the walls of the passage as well as against each other will shake, agitate and vibrate the peanuts in such a way as to dislodge adhering dirt which will travel with the peanuts and such other foreign matter as may be delivered from the trough T upward through the curved conveyor to the portion D formed by the section 52. In the section D, the curvature of the path of travel is reversed from the inward and upward direction of flight in the section C to a continued upward but outward curved path in the section D. There will thus be provided in section D a centrifugal force acting on the outward convex wall of the top of the section 52 whereby heavier materials, such as dirt and debris entrained with peanuts, will tend to follow the inner surface of the top wall of the section 52 and thus be delivered to the louvers 54 from which an outer peripheral portion of the motivating air stream may pass outwardly, carrying with it substantial portions of the dirt and debris. It will of course be understood that the space in the louvers is such as to preclude any discharge of peanuts which may be caused to approach the louvers as they are carried upwardly in the air stream. As portions of the air flow are delivered outwardly through the louvers 54, a turbulence would ensue within the portion D that there would be a diminishment of total air volume were the escaping air not substituted by the admission of fresh air to the section 52 through the air screen 57. Such admission through the screen 57 will act not only to compensate for air discharged through the louvers 54 but will have an efficient action in the preclusion or diminishment of turbulence which might otherwise occur at the point of air discharge through the louvers. It will be understood that in this action the passage of air over the screen will induce inward flow clean air by an aspirating action. It is to be noted that the positioning of the louvers is such as to conform with the horizontal components or curvature of the section 52 so that the air stream moving substantially vertically from the section 38 to the section 52 will be directed outwardly through the louvers 54. It will be also noted that the screen 57 is located opposite the flow point of the louvers on the inner convex bottom of the section 52, by such admission and commingling of the air will assist in the free discharge of the peripheral top area of dirt-laden air from the louvers 54. Since the admission of clean air compensates for the discharge of air through the louvers 54, the air volume passing through the conveyor at the upper end of section 52 is substantially undiminished and while the discharge of air through the louvers may in part diminish the velocity there, it is nevertheless maintained at sufficient velocity for the continued conveyance of the peanuts by entrainment in the air flow so that the peanuts are carried to the terminal generally horizontal curved upper portion of the conveyor to be carried therealong to the terminal in section 60. The further provision of louvers in the top outer convex space of the section 60 permits the free further discharge of conducting air and diminishes both the velocity and volume of air within the section 60 to permit and assist in the downward gravity discharge of the peanuts through the terminal sections 74 and 75. It will be noted that in this final discharge of air, the structure 65 will divert such air away from the bagging station 64 so that such discharge air will not interfere with the operator who may be engaged in the sacking of the peanuts as they are discharged. Further, such discharge of the air from the section 60 will permit the peanuts to be discharged without undue air admission therewith so as to interfere with the appropriate gravity discharge of the peanuts to such receiving means as may be employed.

From the foregoing, it is seen that the present invention provides a novel, simple and improved means for the pneumatic elevation of products discharged from a combine, which means provides as an incident to the travel of the products a secondary cleaning thereof whereby such dirt, foreign matter and debris as may have escaped with such products will be separated from the peanuts or like products, while the cleaned peanuts discharge through the trough of the combine to a position where they will be carried upwardly to fall by gravity into such bags, receptacles and the like as may be provided. As before noted, it will be understood that the inventive concept may be variously designed and constructed to accommodate a wide variety of agricultural implements of the combine type. It will be further understood that in the practice of the invention numerous changes, modifications and the full use of equivalents may be used without departure from the spirit or scope of the invention as defined in the appended claims.

We claim:

1. A pneumatic elevator and recleaner for combines, including a rotary blower, a hopper mounted in communication with said blower for receiving crop material, and a conveyor tube in communication with said hopper extending upwardly from said hopper, said hopper including a venturi for assisting in the entrainment of crop material by air from said tube, said tube being substantially S-shaped and including air outlet means in an outwardly convex upper wall for the discharge of dirt laden air from said tube together with air inlet means in an opposite outwardly concave wall for the introduction of clean air in the air passing through said tube from said hopper.

2. A seed recleaner for a pneumatic conveyor including an arcuate S-shaped upwardly inclined conveyor tube defining air outlets on one convex wall of said tube from which a dirt laden peripheral portion of the air travelling through said tube may be discharged from said tube and an air inlet in said tube on a wall opposed said outlets and cooperatively associated therewith for the admission of clean air to compensate for the volume of dirt laden air discharged through said outlets.

3. A seed recleaner for a pneumatic conveyor including an arcuate S-shaped upwardly inclined conveyor tube defining an air outlet on one convex wall of said tube from which a dirt laden peripheral portion of the air travelling through said tube may be discharged from said tube and an air inlet in said tube on a wall opposed said outlets and cooperatively associated therewith for the admission of clean air to compensate for the volume of dirt laden air discharged through said outlets, and deflector means on said tube for directing air discharged from said outlet laterally away from said tube.

4. An elevating and discharging tube for a pneumatic elevator and recleaner including a reversely curved tube having a vertical receiving portion, a horizontal discharge portion, air outlet means at an outwardly convex wall of said tube, air inlet means at an inwardly concave wall of said tube and cooperatively associated with said air outlet means, means for delivering seed and dirt laden air to said vertical receiving portion and means for discharging seed free from dirt from said discharge portion by gravity.

References Cited in the file of this patent

UNITED STATES PATENTS

| | | |
|---|---|---|
| 821,819 | Neumann | May 29, 1906 |
| 1,023,750 | Morscher | Apr. 16, 1912 |
| 1,275,770 | Scott | Aug. 13, 1918 |
| 1,320,031 | Andrews | Oct. 28, 1919 |
| 2,222,787 | Stadler | Nov. 26, 1940 |
| 2,446,968 | Toner | Aug. 10, 1948 |
| 2,507,669 | Heth | May 16, 1950 |
| 2,668,330 | Gieszl | Feb. 9, 1954 |
| 2,711,247 | Hills | June 21, 1955 |
| 2,715,461 | Maulsby | Aug. 16, 1955 |
| 2,741,888 | Hamel | Apr. 17, 1956 |
| 2,746,808 | Stricker | May 22, 1956 |
| 2,760,325 | Witt | Aug. 28, 1956 |

FOREIGN PATENTS

| | | |
|---|---|---|
| 10,004 | Great Britain | 1909 |